(12) United States Patent
Preciado et al.

(10) Patent No.: US 11,830,383 B2
(45) Date of Patent: Nov. 28, 2023

(54) EXTERNAL ACTIVATING OF QUIESCENT DEVICE

(71) Applicant: PassiveLogic, Inc., Salt Lake City, UT (US)

(72) Inventors: Marciano Preciado, Salt Lake City, UT (US); Sterling Thomas Sleight, Murray, UT (US); Jeremy David Fillingim, Salt Lake City, UT (US)

(73) Assignee: PassiveLogic, Inc., Salt Lake City, UT (US)

( * ) Notice: Subject to any disclaimer, the term of this patent is extended or adjusted under 35 U.S.C. 154(b) by 54 days.

(21) Appl. No.: 17/469,760

(22) Filed: Sep. 8, 2021

(65) Prior Publication Data

US 2023/0076011 A1 Mar. 9, 2023

(51) Int. Cl.
*G09C 1/10* (2006.01)
*H03M 7/40* (2006.01)

(52) U.S. Cl.
CPC ............ *G09C 1/10* (2013.01); *H03M 7/4025* (2013.01)

(58) Field of Classification Search
CPC .............................. G09C 1/10; H03M 7/4025
USPC .......................................................... 380/42
See application file for complete search history.

(56) References Cited

U.S. PATENT DOCUMENTS

| | | |
|---|---|---|
| 4,651,158 A | 3/1987 | Nelson |
| 5,787,133 A * | 7/1998 | Marchetto ............. H04L 1/0057 714/775 |
| 7,418,620 B1 | 8/2008 | Tormasov et al. |
| 7,917,232 B2 | 3/2011 | McCoy et al. |
| 8,024,054 B2 | 9/2011 | Mairs et al. |
| 8,099,178 B2 | 1/2012 | Mairs et al. |
| 8,503,943 B2 | 8/2013 | Spanhake |
| 8,604,746 B2 | 12/2013 | Lee |
| 8,738,908 B2 | 5/2014 | Lee |
| 8,782,619 B2 | 7/2014 | Wu et al. |
| 8,925,358 B2 | 1/2015 | Kasper |
| 9,037,307 B2 | 5/2015 | Kaji |
| 9,843,229 B2 | 12/2017 | Leabman |
| 9,847,669 B2 | 12/2017 | Leabman et al. |
| 9,857,238 B2 | 1/2018 | Malhotra et al. |
| 9,860,961 B2 | 1/2018 | Chemel et al. |

(Continued)

FOREIGN PATENT DOCUMENTS

| | | |
|---|---|---|
| CN | 103926912 A | 7/2014 |
| IN | 206002869 U | 3/2017 |

(Continued)

OTHER PUBLICATIONS

Dai, Wenbin, et al. "Toward self-manageable and adaptive industrial cyber-physical systems with knowledge-driven autonomic service management." IEEE Transactions on Industrial Informatics 13.2 (2016)L pp. 725-736. (Year: 2016).

(Continued)

*Primary Examiner* — Michael S McNally (57) ABSTRACT

After installation, a device may be asleep. A light signal device may send a message to the sleeping device to wake it up. This wake-up message may comprise the light signal device sending programmed light signals, the programmed light signals in modified morse code. An authentication part may also be included in the message. The light signal device may request an authentication message from the sleeping device.

20 Claims, 7 Drawing Sheets

(56) References Cited

U.S. PATENT DOCUMENTS

| | | | |
|---|---|---|---|
| 10,094,586 | B2 | 10/2018 | Pavlovski et al. |
| 10,135,295 | B2 | 11/2018 | Leabman |
| 10,199,849 | B1 | 2/2019 | Bell et al. |
| 10,333,305 | B2 | 6/2019 | Imai et al. |
| 10,386,544 | B2 | 8/2019 | Yuan et al. |
| 10,650,336 | B2 | 5/2020 | Kopp |
| 10,775,824 | B2 | 9/2020 | Main et al. |
| 10,892,946 | B2 | 1/2021 | Costa et al. |
| 10,942,871 | B2 | 3/2021 | Cawse et al. |
| 10,943,444 | B2 | 3/2021 | Boyd et al. |
| 10,966,068 | B2 | 3/2021 | Tramiel et al. |
| 11,088,989 | B2 | 8/2021 | Gao et al. |
| 2006/0103545 | A1* | 5/2006 | Tsou ................ G08C 17/02 398/106 |
| 2008/0296979 | A1 | 12/2008 | Kato et al. |
| 2009/0135753 | A1 | 5/2009 | Veillette |
| 2009/0217063 | A1* | 8/2009 | Tomita ................ G06F 1/3203 713/310 |
| 2014/0215446 | A1 | 7/2014 | Araya et al. |
| 2015/0198938 | A1 | 7/2015 | Steele et al. |
| 2016/0020854 | A1 | 1/2016 | Engel |
| 2016/0062753 | A1 | 3/2016 | Champagne |
| 2016/0086191 | A1 | 3/2016 | Fonzi et al. |
| 2016/0092427 | A1 | 3/2016 | Bittmann |
| 2016/0248251 | A1 | 8/2016 | Tinnakornsrisuphap et al. |
| 2017/0217390 | A1 | 8/2017 | Curtis et al. |
| 2017/0299210 | A1 | 10/2017 | Nyamjav et al. |
| 2018/0224819 | A1 | 8/2018 | Noboa |
| 2018/0375720 | A1 | 12/2018 | Yang et al. |
| 2019/0020197 | A1 | 1/2019 | Ahn et al. |
| 2019/0074990 | A1 | 3/2019 | Reimer |
| 2019/0156443 | A1 | 5/2019 | Hall |
| 2019/0220077 | A1 | 7/2019 | Tuan et al. |
| 2019/0258251 | A1 | 8/2019 | Ditty et al. |
| 2020/0284883 | A1* | 9/2020 | Ferreira ................ G01S 17/10 |
| 2022/0095084 | A1 | 3/2022 | Evans et al. |

FOREIGN PATENT DOCUMENTS

| | | |
|---|---|---|
| JP | 2018033257 A | 3/2018 |
| WO | 2008016500 A3 | 3/2008 |

OTHER PUBLICATIONS

González-Briones, Alfonso, et al. "Energy optimization using a case-based reasoning strategy." Sensor 18.3 (2018): pp. 1-27. (Year: 2018).

Jayakumar, Geetha, and Ganapathy Gopinath. "Ad hoc mobile wireless networks routing protocols—a review." Journal of Computer Science 3.8 (2007): pp. 574-582. (Year: 2007).

Anastasi et al., Ad Hoc Networks 7 (2009) 537-568.

Cao et al., Towards Energy-efficient Wireless Networking in the Big Data Era: A Survey, IEEE Communications Surveys & Tutorials, vol. 20, No. 1, First Quarter 2018.

De Meester et al., SERIF:A Semantic Exercise Interchange FormatConference: Proceedings of the 1st International Workshop on LINKed EDucation, Oct. 2015.

Khan et al., Energy management in Wireless Sensor Networks: A survey. Computers and Electrical Engineering, Elsevier, 2014, vol. 41, Jan. 2015, p. 159-176.

Mouser Electronics News Release, Aug. 16, 2018.

Ouf et al., Effectiveness of using WiFi technologies to detect and predict building occupancy, Sust. Buildi. 2, 7 (2017).

RadioMaze, Inc., "WiFi signals enable motion recognition throughout the entire home," Dec. 4, 2017.

Sensorswarm, 2018.

Serale G., et al., Model Predictive Control (MPC) for Enhancing Building and HVAC System Energy Efficiency: Problem Formulation, Applications and Opportunities, Energies 2018, 11, 631; doi: 10.3390, Mar. 12, 2018.

Chowdhury, M. E. H., et al., "A Low-Cost Closed-loop Solar Tracking System Based o the Sun Position Algorithm", Journal of Sensors, vol. 2019, Article ID 3681031, 11 pp.

Kreider, D., and Lahr, D., "Trapezoidal Rule and Simpson's Rule", 2002, 2008, 2010.

Written Opinion of the International Searching Authority for PCT/US22/36676, dated Dec. 5. 2022.

International Search Report for International application No. PCT/US22/36676, dated Dec. 5, 2022.

International Search Report for PCT/US22/42915, dated Feb. 23, 2023.

* cited by examiner

EXTERNAL ACTIVATING OF QUIESCENT DEVICE

FIELD

The present disclosure relates to turning on sleeping devices. More specifically, the present disclosure relates to waking up a device by sending it a light signal.

SUMMARY

This summary is provided to introduce a selection of concepts in a simplified form that are further described below in the Detailed Description section. This summary does not identify required or essential features of the claimed subject matter.

In embodiments, a programmable signaling light source with a processor and a memory is disclosed, comprising: a programmable light source with a processor and memory operationally able to flash light at a known intensity with a known delay between light flashes; an encoder operationally able to encode a message; and an executable instruction that upon execution by the processor performs the following actions: the encoder encoding a message comprising a message part and an authentication part, producing an encoded message; and the programmable light source sending the encoded message at least twice; wherein the encoded message is encoded in modified morse code.

In embodiments, the programmable light source sending the encoded message further comprises the programmable light source repeatedly sending the encoded message.

In embodiments, the modified morse code comprises a DOT being a light signal of one time duration, a DASH being a light signal of 3 time durations, END OF PART OF A LETTER being a light signal of one time duration, an END OF LETTER being a light signal of 5 time durations; and an END OF WORD being a light signal of 9 time durations.

In embodiments, further comprising a second transmitter, wherein the executable instruction that upon execution by the processor performs the further actions: after sending the encoded message, requesting a secret message using the second transmitter; upon receipt of the secret message, determining if the secret message is equivalent to the authentication part; and when the secret message is equivalent to the authentication part, the second transmitter sends a second message.

In embodiments, the authentication part is a letter randomly chosen by the light transmitting device.

In embodiments, the authentication part further comprises the letter chosen at random translated into modified morse code, and wherein the authentication part is followed by a modified morse code END OF WORD.

In embodiments, the light signal comprises an intensity of about 40 lumens.

In embodiments, the light signal comprises an intensity of greater than 40 lumens.

In embodiments, a method implemented by one or more computers with memory, one or more processors, a light source, and a transceiver is disclosed, comprising: translating a message into modified morse code; the message comprising a message part and an authentication part; and repeatedly transmitting the message; wherein the modified morse code comprises signals, and the signals comprise a light signal followed by a number of time durations.

In embodiments, further comprising: requesting a secret message; receiving a secret message using the transceiver; checking if the secret message is equivalent to the authentication part; and when the secret message is equivalent to the authentication part, sending a second message.

In embodiments, the message is encoded in modified morse code, wherein the modified morse code comprises signals, and the signals comprise a light signal followed by a number of time durations.

In embodiments, a DOT is one time duration, a DASH is three time durations, an end of part of a letter is one time duration, an END OF LETTER is 5 time durations; and an END OF WORD is 9 time durations.

In embodiments, the second message is sent by a second transmitting device.

In embodiments, the second transmitting device is a wireless transceiver.

In embodiments, the sent message comprises a signal of a time duration, and wherein one time duration comprises about 8 ms.

In embodiments, one time duration comprises <8 ms.

In embodiments, the transmitted message is a word comprising two letters in modified morse code and a third authentication letter in modified morse code followed by an END OF WORD.

In embodiments, a non-transitory computer readable storage medium storing instructions for externally activating a quiescent device wherein the instructions when executed by a processor, cause the processor to perform steps is disclosed, the instructions including: translating a message into modified morse code; the message comprising a command part and an authentication part; repeatedly transmitting the message; wherein the modified morse code comprises signals, and the signals comprise a light signal followed by a number of time durations; requesting a secret message using a second transceiver; and receiving a secret message using the second transceiver; when the secret message is equivalent to the authentication part, resending the message.

In embodiments, the signals, comprise a light flash followed by a number of time durations prior to the next light flash.

In embodiments, the modified morse code comprises signals, and the signals comprise a rising or falling edge followed by a number of time durations.

In embodiments, a DOT is one time duration, a DASH is three time durations, an END OF PART OF A LETTER is 1 time duration, an END OF LETTER is 5 time durations; and an END OF WORD is 9 time durations.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES.

Non-limiting and non-exhaustive embodiments of the present embodiments are described with reference to the following FIGURES, wherein like reference numerals refer to like parts throughout the various views unless otherwise specified.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to activating quiescent devices.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects.

Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

Embodiments may be implemented in edge computing environments where the computing is done within a network which, in some implementations, may not be connected to an outside internet, although the edge computing environment may be connected with an internal internet. This internet may be wired, wireless, or a combination of both. Embodiments may also be implemented in cloud computing environments. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by general or special purpose hardware-based systems that perform the specified functions or acts, or combinations of general and special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

I. Overview

A device by default is, at times, turned off, or quiescent. That is, it is in a state where it is currently not harvesting data or sending data, though it may be on schedule such that it will harvest data or send data at a later time. When the device is to be turned on, recommissioned, etc., a programmable signaling light source may send it a repeating message comprising light flashes that are separated by different amounts of time. The signaling light may trigger power being applied to the device, and/or prompt an early wakeup. The message may be in modified morse code. When the device fully wakes up, the message is read. Upon request from the programmable light source to the external device 220A, the external device 220A may send an authentication code, which the external device reads. If the authentication code is correct, the programmable light source may send another message. The modified morse code provides a different timing for spaces between parts of letters, end of letters, and end of words.

II. Exemplary System Embodiments

Figure 1:
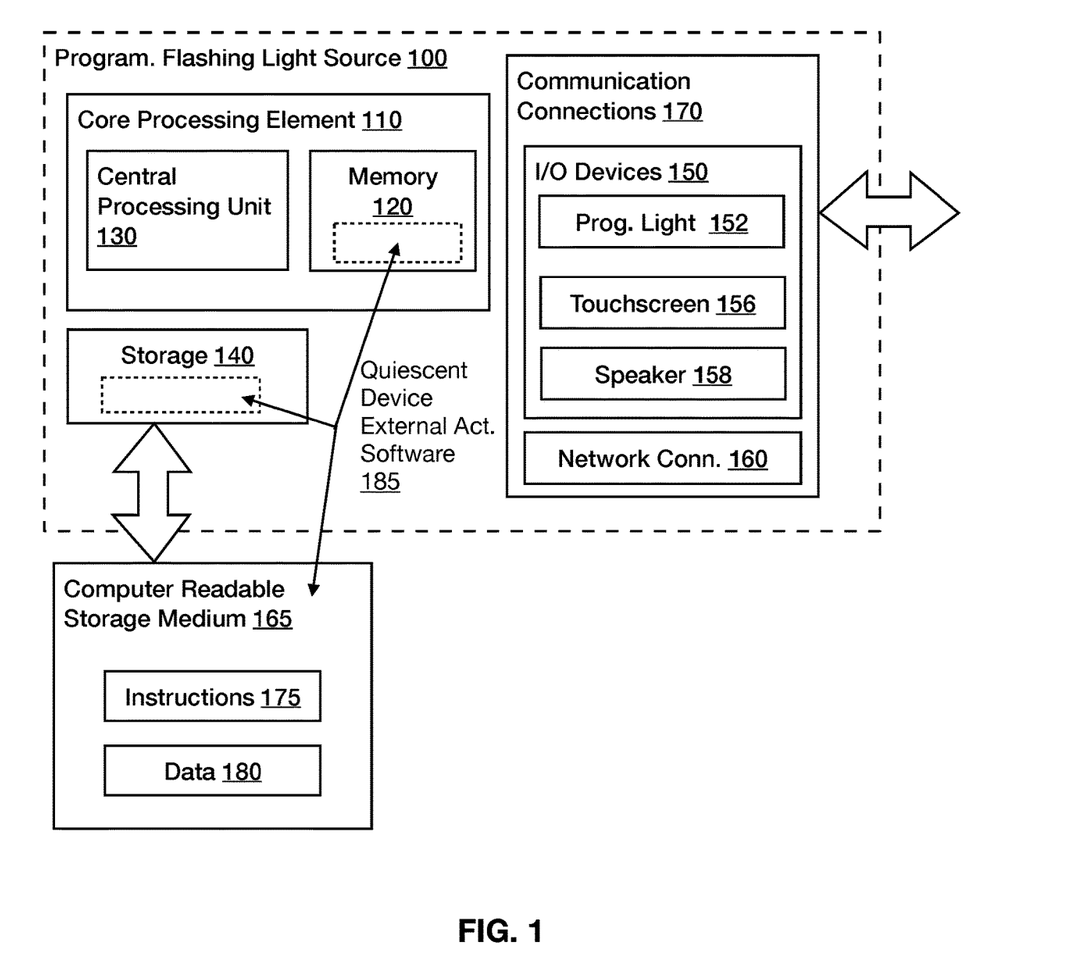
FIG. 1 discloses a computing system in conjunction with which described embodiments can be implemented.

FIG. 1 illustrates a generalized example of a suitable programmable signaling light source 100 in which described embodiments may be implemented. The computing environment 100 is not intended to suggest any limitation as to scope of use or functionality of the disclosure, as the present disclosure may be implemented in diverse general-purpose or special-purpose computing environments.

With reference to FIG. 1, the computing environment 100 includes at least one processor, This processor may come in many forms, such as core processing elements 110. The core processing element 110 may comprise a central processing unit 130, and memory 120. The central processing unit 130 executes computer-executable instructions and may be a real or a virtual processor. The memory 120 may be volatile memory (e.g., registers, cache, RAM), non-volatile memory (e.g., ROM, EEPROM, flash memory, etc.), or some combination of the two. The memory 120 stores software 185 implementing the described methods of externally activating a quiescent device. Specialized processors may also be included.

A computing environment may have additional features. For example, the programmable signaling light source environment 100 includes storage 140 and communication connections 170, which may include one or more input/output devices 150, one or more network connections (e.g., wired, wireless, etc.) 160 as well as other communication connections (not shown). Communication connections 170 may include one or more wireless transceivers for performing wireless communication and/or one or more communication ports for performing wired communication. In embodiments, communication device 170 may be configured to send messages through a programmable light 152.

Input device(s) 150 may be a device that allows a user or another device to communicate with the programmable signaling light source 100. These may comprise a programmable light source 152 such as a flashlight, and a camera flash (a strobe light that can connect to a camera or a computing device). Other devices that may be included comprise a microphone, a mouse, a pen, a trackball, a touchscreen 156, or another device that provides input to the computing environment associated with the programmable light source 100. For audio, the input device(s) 150 may be a sound card or similar device that accepts audio input and produces audio output in analog or digital form, a speaker 158, or a CD-ROM reader that provides audio samples to the computing environment. The output device(s) 150 may be a touchscreen 156, a display, a keyboard, a printer, a speaker, a CD-writer, a computer readable storage medium 165, or another device that provides output from the programmable signaling light source computing environment 100. An interconnection mechanism (not shown) such as a bus, controller, or network interconnects the components of the computing environment 100. Typically, operating system software (not shown) provides an operating environment for other software executing in the computing environment, and coordinates activities of the components of the computing environment.

The storage 140 may be removable or non-removable, and includes magnetic disks, magnetic tapes or cassettes, CD-ROMs, CD-RWs, DVDs, flash drives, or any other medium which can be used to store information and which can be accessed within the computing environment 100. The storage 140 stores instructions for the software, such as quiescent device external activation software 185 to implement methods of sending messages comprising light flashes, including wakeup messages, to a different device.

The communication connection(s) 170 enable communication over a communication medium to another computing entity. The communication medium conveys information such as computer-executable instructions, compressed graphics information, or other data in a modulated data signal. Communication connections 170 may comprise input/output devices 150, and input/output devices that allows a client device to communicate with another device over network 160. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 160 may be a combination of multiple different kinds of wired or wireless networks. The network 160 may be a distributed network, with multiple computers, which might be building controllers acting in tandem. A computing connection 170 may be a portable communications device such as a wireless handheld device, a cell phone device, and so on.

Computer-readable media are any available non-transient tangible media that can be accessed within a computing environment. By way of example, and not limitation, with the computing environment, computer-readable media include memory 120, storage 140, communication media, and combinations of any of the above. Computer readable storage media 165 which may be used to store computer readable media comprises instructions 175 and data 180. Data Sources may be computing devices, such as general hardware platform servers configured to receive and transmit information over the communications connections 170. Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

Figure 2A:
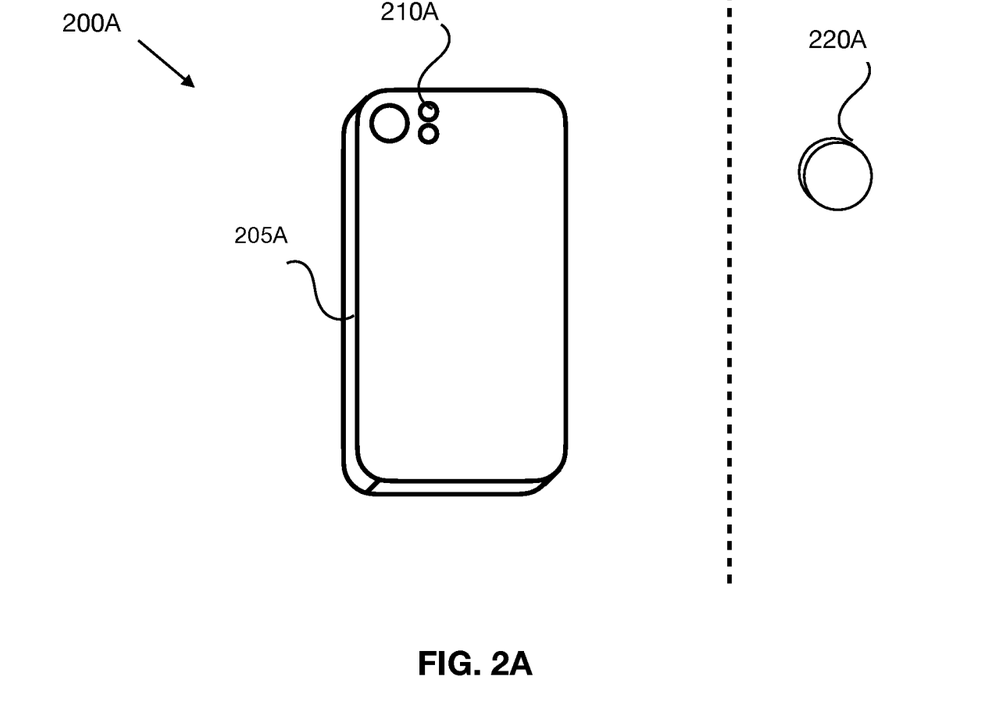
FIGS. 2A and 2B disclose physical embodiments in which external activation of a quiescent device may be possible.
Figure 2B:
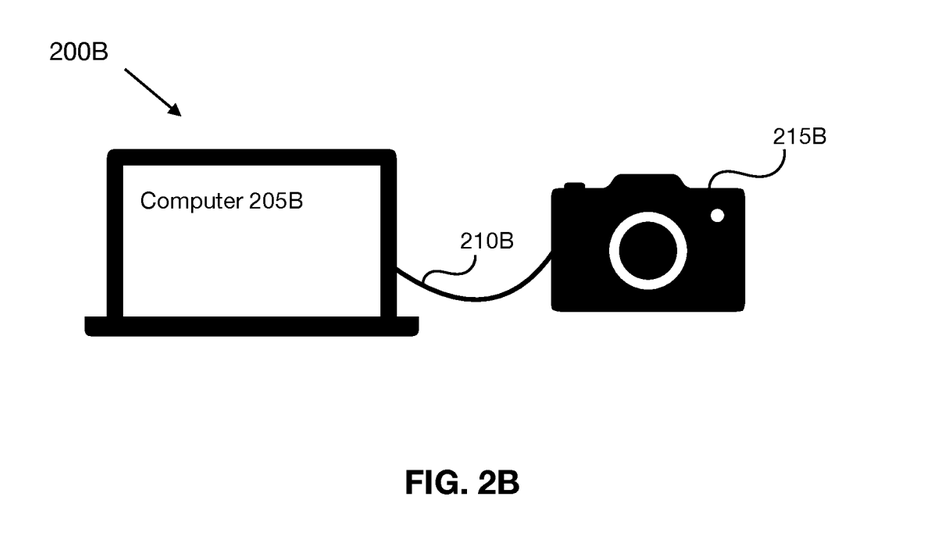

With reference to FIGS. 2A and 2B, two embodiments of devices that can externally activate a quiescent device are disclosed. At 200A a cell phone embodiment 205A is disclosed that includes a flashlight 210A that can be programmed to send messages. These messages may be sent to a quiescent device 220A. The device 200B comprises a computer 205B connected 210B to a signal element 215B. The computer may program the signal element 215B (which may be a camera, a flashlight, or another type of light that can be programmed) to signal appropriately for message creation. The signals here may also be directed to a quiescent device, e.g. 220A. A light connected to a larger device may allow a device in an inconvenient location to be signaled.

Figure 3:
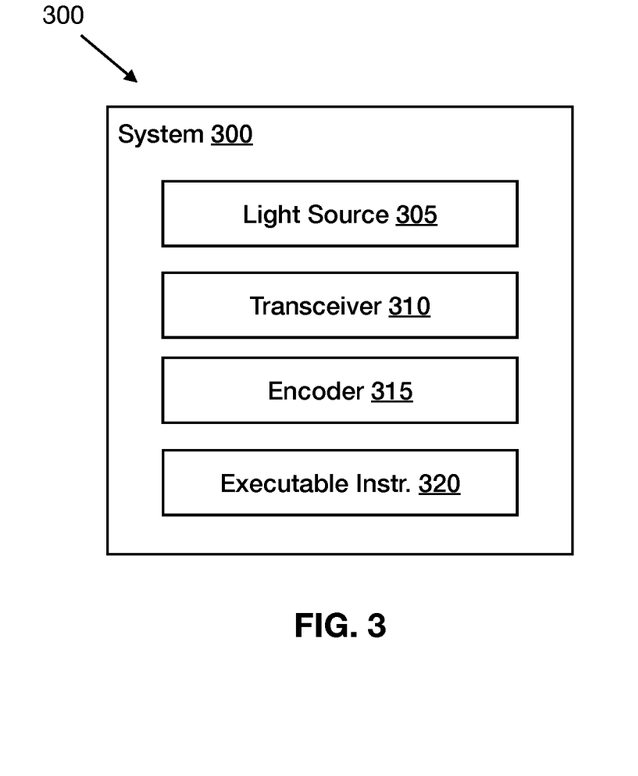
FIG. 3 discloses systems that may be used to read a message that may be used with embodiments disclosed herein.

FIG. 3 discloses a system 300 that may be used to activate a quiescent device using a programmable light source 305. The signaling light may trigger power being applied to the quiescent device, and/or prompt an early wakeup of the device. A quiescent device may be a device that is sleeping on a schedule, but may be activated for a task off schedule, that is factory turned off, etc. This programmable light source 305 may be operationally able to flash a light signal at a known intensity for a known time. The signals may have a certain amplitude. For example, the signals may be at least 40 lumens, about 40 lumens, about 45 lumens, about 60 lumens, etc. The signal may be such that it is greater than flashes that appear lambently. When a quiescent device is in a naturally dark area, a dimmer light signal may be used. Similarly, a naturally bright area may use a signal of greater amplitude. The signals may last for multiples of a time unit, may be separated by multiples of a time unit, and so on. This is discussed in greater detail with reference to FIG. 7 and the surrounding text. A transceiver 310 may be able to transmit information wirelessly, wired, etc., to, at least the quiescent device, once wakened. An encoder 315 may encode a message in a code such that the light source 305 can signal it to the quiescent device. The code may be modified morse code, or a different code that can be signaled. The system may also have executable instructions 320 that upon execution by a processor associated with the system, e.g., 110, 130, etc., perform actions of various types. These actions will be discussed with reference to FIG. 4.

III. Exemplary Method Embodiments

Figure 4:
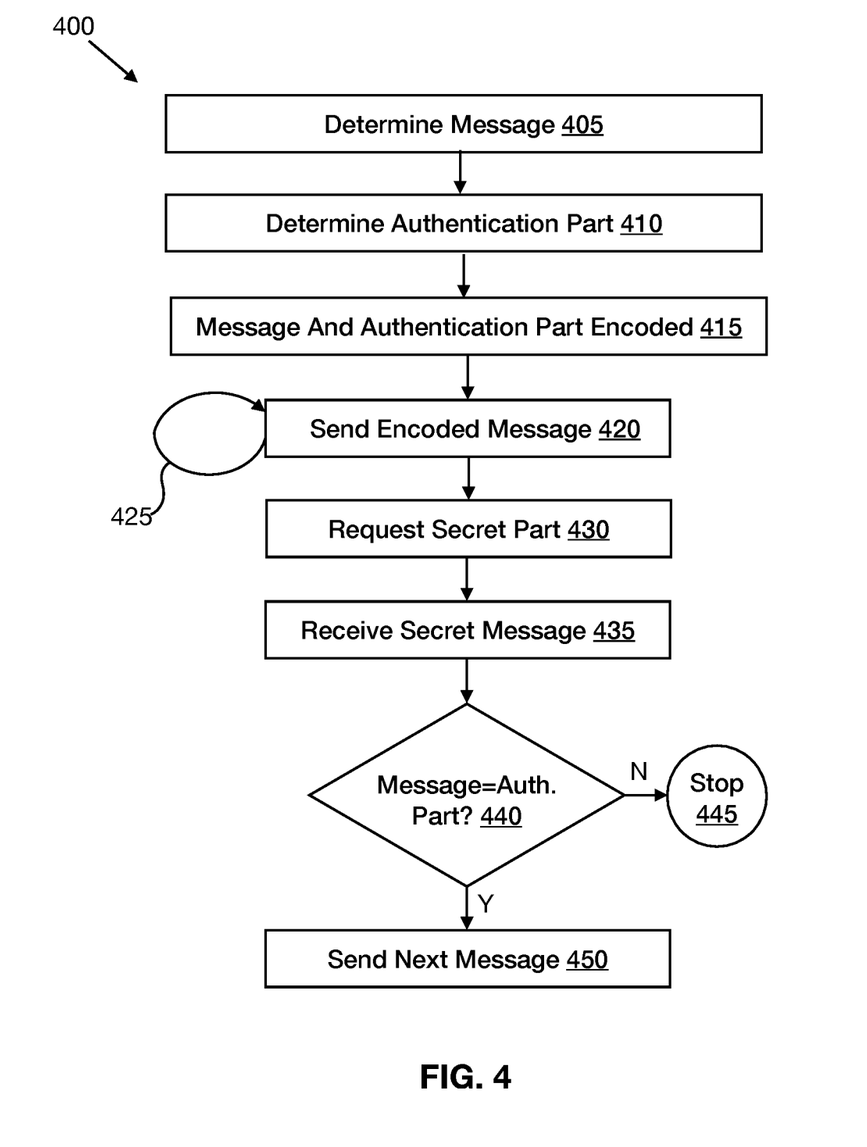
FIG. 4 discloses methods that may be used to read a message that may be used with embodiments disclosed herein.

With reference to FIG. 4, a flowchart 400 discloses methods that may be used with embodiments disclosed herein. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting. In some embodiments, method 400 may be implemented in one or more processing devices (e.g., a digital processor such as the cpu 130, a microprocessor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 405, a message is determined. This message may be a certain number of alphabetic characters. For example, in some embodiments, the message may be two characters. As an example, the letters "PR" may be code for "the quiescent device should turn on and start provisioning," There may be many messages, the messages may comprise more or fewer letters, may comprise multiple words, etc. At operation 410, an authentication part of the message may be determined. When the signaling light source sends a message, in may include an authentication message that will be sent back from the device to ensure that the correct device has received the message, and understands the message. In some embodiments, the authentication part is a symbol chosen at random. This symbol may be a letter, a number, an ideogram, an emoji, a unicode character, etc. In some embodiments, the authentication part is more than symbol. In some embodiments, the authentication part may be determined by a known algorithm which, when sent, may be deciphered by the quiescent device. At operation 415, the message and authentication type are encoded. This encoding may be in modified morse code, or a different type of code. More information on message encoding may be found with reference to FIGS. 5-7 and the surrounding text.

At operation 420, the encoded message is sent. This encoded message comprises spikes of light and pauses between the spikes. The spikes are sent, e.g., using the programmable light 152. This light should be a certain amplitude; what amplitude is necessary depends on the parameters of the quiescent device to be awakened. The shape of the light spike is not so important, as long as the time between the first rising edge and the next rising edge can be accurately flashed, as the quiescent device 220A in some embodiments, reads the rising edges. In some embodiments, the message may be in morse code modified as disclosed herein. At operation 425, the encoded message is sent again. The message that is to be sent also is used as the wakeup signal. Therefore, the message must be sent enough times that the quiescent device 220A should be initially wakened by some combination of time flashes which will then cause the quiescent device 220A to boot up. The encoded message may be sent sufficient times to allow for the boot up time, such that a full message is received after the boot up process has finished. The number of times a message should be sent 425 may depend on the time it takes the quiescent device to boot up. After the encoded message has been sent for sufficient times, at operation 430, a two factor authentication method may be used. This may entail requesting an out of band message from the quiescent device, which may be expected to be the authentication part of the original message. Even though the message was originally sent using a programmable light device 152, this out of band message may be requested using a network connection 160, such as a wireless transmitter, or a different method. At operation 435, a secret message is received. This may be received from the network connection, which may be a transceiver, a wireless transmitter, or using a different method. At decision point 440, this secret message is authenticated. This may be performed by comparing the secret message received to the authentication part initially sent. If the authentication portion is equivalent to the secret message, then at operation 450, a next message is sent. This next message may be sent using a transceiver, a wireless transmitter, or a different network connection. If the wrong authentication part is sent, no next message is sent, etc., then at operation 445, the quiescent device wakeup method is stopped.

IV. Exemplary Messages

Figure 5:
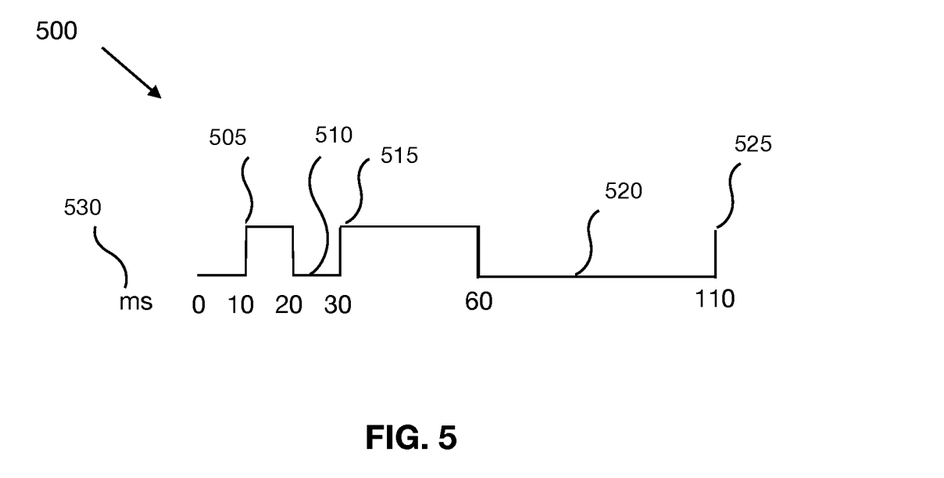
FIG. 5 discloses a sample message that may be sent using embodiments disclosed herein.

FIG. 5 at 500 discloses a digital signal generated by a light circuit that might be used with embodiments that use the modified morse code described herein. FIG. 5 at 500 specifically discloses a modified international morse code "A". The pulses in FIGS. 5, 6, and 7 are measured in ms 530 (in this illustrative example), with a standard time duration of 10 ms. "A" in international morse code is a DOT DASH (•—), which is a pulse 505 (rising and trailing edge) of one time duration followed by an END OF PART OF LETTER 510 (a signal low of one time duration) followed by a DASH 515 of 3 time durations, followed by an END OF PART OF WORD 520 of 9 time durations. The next rising signal appears at 525. This square signal is a digitized signal, but an analog signal with appropriate amplitude may also be used.

Figure 6:
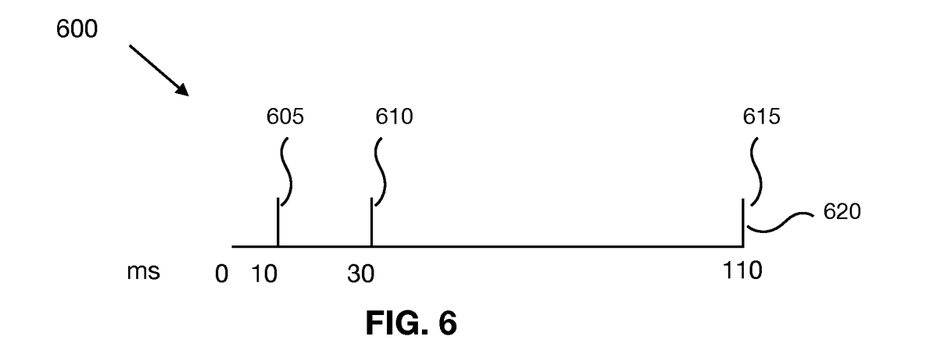
FIG. 6 discloses a sample message that may be received using embodiments disclosed herein.

FIG. 6 at 600 discloses the digital signal of FIG. 5 from the perspective of a quiescent device (e.g., 220A) receiving the signal. The quiescent device may have a light circuit with a high pass filter, or a different method of reading rising edges. In such cases, only the rising edge of each pulse may make it through such a filter. As such, the time that is important is that between rising edges. The quiescent device 220A may also only allow pulses of at least a certain amplitude 620. This may allow deliberate flashes to be read, while random light events in an area that are of insufficient intensity or at an incorrect frequency to indicate intent are to be ignored. When only the rising edges of FIG. 5 at 500 are used, we see spike 605, which corresponds to the rising edge of the DOT; spike 610, which corresponds to the rising edge of the DASH, and spike 615, which corresponds to the next rising edge received 610, the rising edge of the DASH 515. As such, only the time between rising edges in the message may be considered by the quiescent device 220A. Thus, the signal sent by the signaling devices may be sent understanding which parts will be read by the quiescent device, and modified therein.

Figure 7:
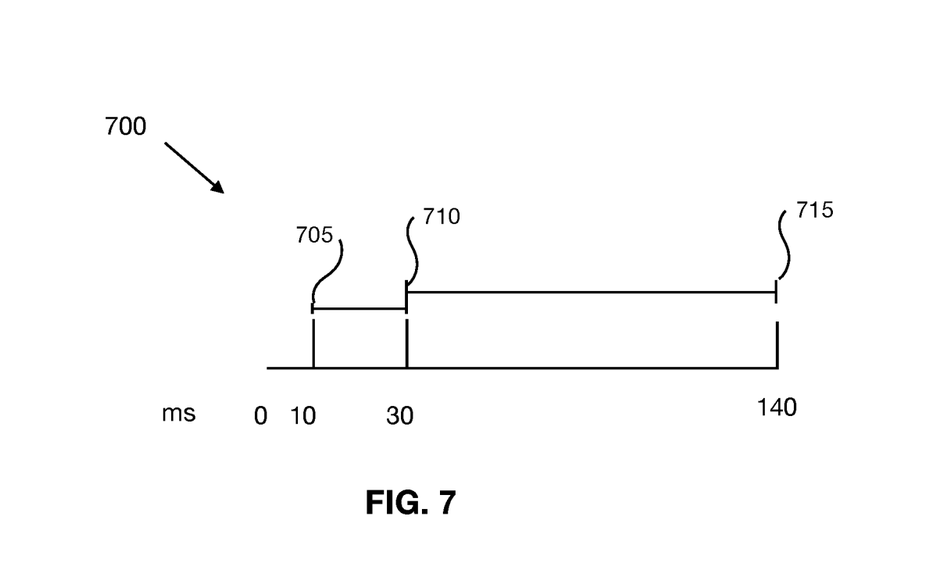
FIG. 7 discloses decoding a sample message as used in embodiments described herein.

FIG. 7 at 700 discloses information derived from a digital signal of "A" shown in FIG. 5 from the perspective of a device receiving the signal (e.g., 220A) as used in embodiments described herein. Two time measurements are decoded, the time from the rising edge of the DOT (transformed into a spike) 505, 705 to the rising edge of the DASH (transformed into a spike) 705, which is 20 ms long, and time from the rising edge of the DASH 515 (transformed into a spike) to the next rising edge (transformed into a spike) 710, which is 80 ms long. Using the table 900, a DOT followed by an end of a part of letter is 2 base units long 615, and the base unit is 10 ms, so the time 705-710 (20) indicates a morse signal DOT followed by a morse signal END OF PART OF LETTER 915, which is of length 2. The next signal, the time measured between the rising edges (transformed into spikes) 710 and 715 is 80 ms—8 base units long (10 ms*8), and so, again referring to table 900, 8 units indicates a morse signal DASH (3 time units) followed by an END OF LETTER (5 time units). Having read an END OF LETTER, the letter can now be deciphered, producing a DOT DASH, which encodes to an "A". As shown with reference to FIGS. 8 and 9, and the surrounding text, the modified morse parts of speech base unit multiples have been adjusted such that each combination of morse high and morse low will produce a unique time duration.

Figure 8:
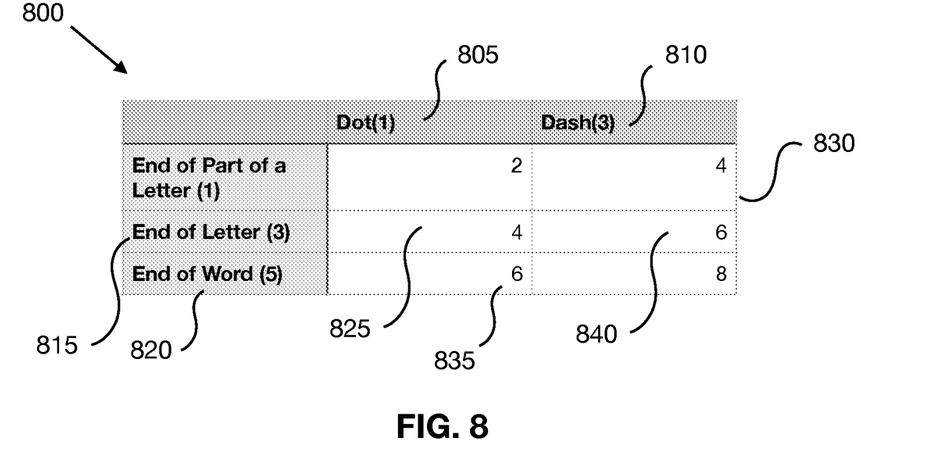
FIG. 8 discloses a portion of an international morse code chart.
Figure 9:
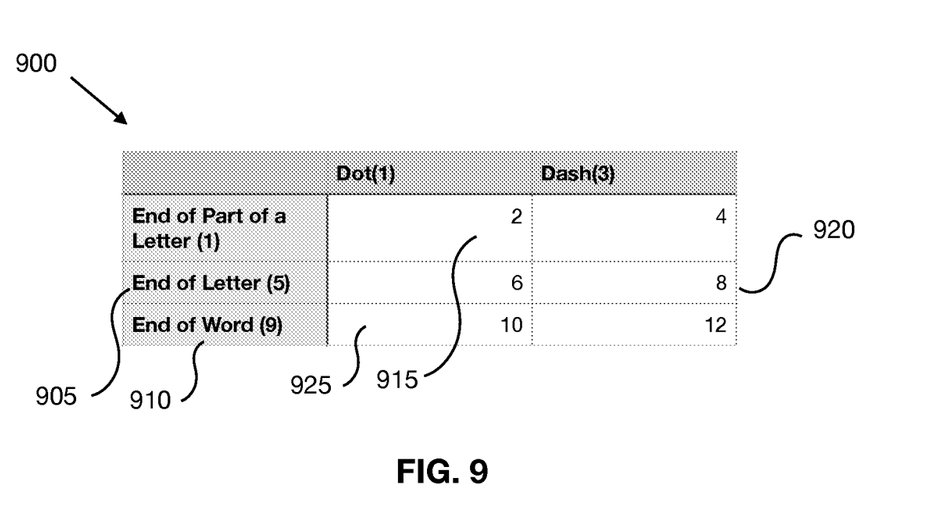
FIG. 9 discloses a portion of a modified morse code chart, as used in embodiments described herein.

Turning now to FIGS. 8 and 9, an embodiment of message coding and decoding is disclosed. FIG. 8 at 800 describes a current international morse code chart. FIG. 9 at 900 discloses a modified morse code chart, as used in embodiments described herein. In normal morse code 800, both signal highs (e.g., 505) and signal lows (e.g., 510) are read. The column headings indicate signal high length. So, the DOT(1) 805 and DASH(3) 810 indicate that a DOT is a signal high 1× the base unit signal, and the DASH is a signal high 3× the base units. The rows in the chart 800 indicate signal lows. A signal low of 3 time units 815 indicates the traditional morse code END OF LETTER; a signal low of 5 time unit 820 indicates the traditional morse code END OF WORD. When there is no differentiation between signal lows and highs, but only pauses, as in an exemplary modified morse code disclosed herein, the traditional morse code has overlapping pause lengths. A DASH/END OF PART OF A LETTER 830 and DOT/END OF LETTER 825 are both 4× the base unit. Similarly, a DOT/END OF WORD 835 and a DASH/END OF LETTER 840 are both 6× the base unit. This is significant, as in an exemplary embodiment disclosed here, only leading edges are read by the quiescent device 220A. As such the duration of the signal on plus the length of the signal off is the information that is available. With traditional morse code, if a duration of 4× between signal spikes appeared, there is no way to know if the signal desired was a DASH/END OF PART OF A LETTER 830 or a DOT/END OF LETTER 825. To avoid combination collisions, multiples of the base timing unit that are assigned to each part of speech are adjusted as shown with reference to FIG. 9.

FIG. 9 at 900 discloses a modified morse code chart. To avoid combination collisions, the multiples of the base timing unit that are assigned to each part of speech are adjusted to be unique. As such, the END OF LETTER signal 905 equals 5 time durations. The END OF WORD signal 910 equals 9 time durations. These time durations are added to the DOT or DASH time duration to produce a unique time duration. As an example, the DOT (1) followed by an End of Part of a Letter (1) 915 will take 2× the base unit, a DASH (3)/END OF LETTER (5) will take 8× the base unit 920, and a DOT (1)/END OF WORD (9) 925 will take 10× the base unit, etc.

Figure 10:
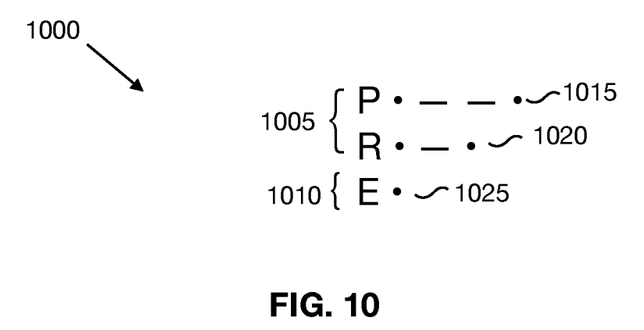
FIG. 10 discloses various portions of an exemplary message as used in embodiments described herein.
Figure 11:
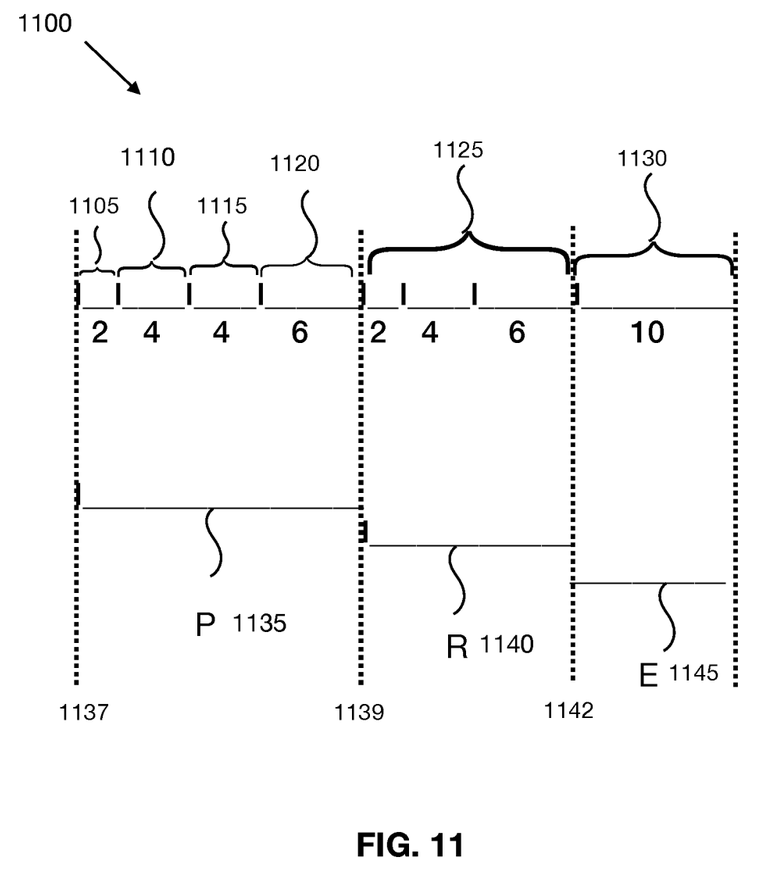
FIG. 11 discloses decoding a sample message as used in embodiments described herein.

FIGS. 10 and 11 disclose creation of messages using modified morse code in greater detail. FIG. 10 at 1000 shows the international morse code for a message "PRE". This message comprises a message part—"PR" 1005 (which may indicate that the device is to be provisioned), and an authentication part chosen at random—"E" 1010. FIG. 11 at 1100 disclose the message translated into a form that may be sent to wake up a device. The P 1135 in international morse code is •——• 1015. More completely, this works out to spike 1137 DOT (1 time period)+Part of Word (1 time period) to produce 2 time periods 1105, spike 1139, DASH (three time periods)+Part of Word (1 time period) to produce 4 time periods 1110, spike 1142, DASH (three time periods)+Part of Word (1 time period) to produce 4 time periods 1115, spike, DOT (1 time period+END OF LETTER (5 time periods) to produce 6 time periods 1120. The R 1020 is a DOT DASH DOT 1020. The signal that represents the morse code letter R 1140 is the set of spikes and pauses 1125 corresponding to a spike followed by a pause of 2 time periods (DOT followed by an end of part of letter), a spike followed by a pause of 4 time periods (DASH followed by an end of part of letter), and a spike followed by a pause of 6 time durations (DOT followed by an END OF LETTER). The last letter in the word, E 1025 is a DOT, in morse code, but because it is the last letter in the word, it is followed by an END OF WORD signal 925, which corresponds to 10 time durations 925. This results, e.g., in a spike 1142 followed by a pause of 10 time periods 1130, 1145. With the receipt of the END OF WORD (after deciphering), this message is known to be finished. Some messages may be longer than a single word, in which case, the modified morse code table may be extended.

V. Exemplary Computer-Readable Medium

With reference to FIG. 1, some embodiments include a configured computer-readable non-transitory storage medium 165. Non-transitory refers to computer-readable media (CRM) that stores data for short periods or in the presence of power such as a memory device or Random Access Memory (RAM). Non-transitory medium 165 may include disks (magnetic, optical, or otherwise), RAM, EEPROMS or other ROMs, and/or other configurable memory, including computer-readable media (not directed to a manufactured transient phenomenon, such as an electrical, optical, or acoustical signal). The storage medium which is configured may be a removable storage medium 165 such as a CD, DVD, or flash memory. A program on the storage medium may be run on a processor (e.g., 110, 112, 115, etc.) which is coupled to a memory. Such a memory may be a general-purpose memory (which may be primary, such as RAM, ROM, CMOS, or flash; or may be secondary, such as a CD, a hard drive, an optical disk, or a removable flash drive), can be configured into an embodiment using the computing environment 100 in the form of data 180 and instructions 175, read from a source, such as an output device 155, to form a configured medium with data and instructions which upon execution by a processor perform a method for computing traveling comfort information. The configured medium 165 is capable of causing a computer system to perform actions as related herein.

Some embodiments provide or utilize a computer-readable storage medium 165 configured with software 185 which upon execution by at least a central processing unit 130 performs methods and systems described herein.

In view of the many possible embodiments to which the principles of the technology may be applied, it should be recognized that the illustrated embodiments are examples and should not be taken as a limitation on the scope of the invention. For instance, various components of systems and tools described herein may be combined in function and use. We, therefore, claim as our invention all subject matter that comes within the scope and spirit of these claims.

We claim:

1. A signaling device for activating a sleeping device comprising:
   a light source;
   a memory; and
   a processor configured to:
   determine a message to be delivered to a sleeping device,
   encode the message for transmission via flashing light signal to produce an encoded message, wherein the encoded message specifies a sequence of light flashes, and
   control the light source to flash light according to the sequence of light flashes at an intensity operable to cause power to be applied to the sleeping device, whereby the sleeping device is caused to awaken and receive the encoded message.

2. The signaling device of claim 1, wherein the message comprises an authentication code and the processor is further configured to:
   receive a response from the sleeping device via a communications channel other than a channel used to transmit the encoded message;
   determine whether the response comprises the authentication code; and
   when the response comprises the authentication code, proceed to communicate further with the sleeping device.

3. The signaling device of claim 1, wherein the message comprises an instruction for the sleeping device to perform once awakened.

4. The signaling device of claim 1, wherein, in encoding the message for transmission via flashing light signal, the processor is configured to encode the message entirely onto rising edges of the sequence of light flashes.

5. The signaling device of claim 1, wherein, in encoding the message for transmission via flashing light signal, the processor is configured to encode the message according to a modified Morse code scheme wherein each pair of:
   one of the DOT and DASH symbols, and
   one of the End of Part of Letter, End of Letter, and End of Word symbols are associated with a unique duration, whereby collision of durations between symbol pairs is avoided.

6. The signaling device of claim 1, wherein in controlling the light source, the processor is configured to control the light source to flash light according to sequence of light flashes multiple times, whereby the encoded message is transmitted to the sleeping device multiple times.

7. The signaling device of claim 1, wherein, in controlling the light source, the processor is configured to set the intensity operable to cause power to be applied to the sleeping device based on a measure of an ambient light level.

8. A method performed by a signaling device for activating a sleeping device comprising:
   determining a message to be delivered to a sleeping device,
   encoding the message for transmission via flashing light signal to produce an encoded message, wherein the encoded message specifies a sequence of light flashes, and
   controlling a light source to flash light according to the sequence of light flashes at an intensity operable to cause power to be applied to the sleeping device, whereby the sleeping device is caused to awaken and receive the encoded message.

9. The method of claim 8, wherein the message comprises an authentication code and further comprising:
receiving a response from the sleeping device via a communications channel other than a channel used to transmit the encoded message;
determining whether the response comprises the authentication code; and
when the response comprises the authentication code, proceeding to communicate further with the sleeping device.

10. The method of claim 8, wherein the message comprises an instruction for the sleeping device to perform once awakened.

11. The method of claim 8, wherein the step of encoding the message for transmission via flashing light signal comprises encoding the message entirely onto rising edges of the sequence of light flashes.

12. The method of claim 8, wherein the step of encoding the message for transmission via flashing light signal comprises encoding the message according to a modified Morse code scheme wherein each pair of:
one of the DOT and DASH symbols, and
one of the End of Part of Letter, End of Letter, and End of Word symbols are associated with a unique duration, whereby collision of durations between symbol pairs is avoided.

13. The method of claim 8, wherein in controlling the light source, the processor is configured to control the light source to flash light according to sequence of light flashes multiple times, whereby the encoded message is transmitted to the sleeping device multiple times.

14. The method of claim 8, wherein the step of controlling the light source comprises setting the intensity operable to cause power to be applied to the sleeping device based on a measure of an ambient light level.

15. A non-transitory computer readable storage medium encoded with instructions for execution by a processor for activating a sleeping device, the non-transitory computer readable storage medium comprising:
instructions for determining a message to be delivered to a sleeping device,
instructions for encoding the message for transmission via flashing light signal to produce an encoded message, wherein the encoded message specifies a sequence of light flashes, and
instructions for controlling a light source to flash light according to the sequence of light flashes at an intensity operable to cause power to be applied to the sleeping device, whereby the sleeping device is caused to awaken and receive the encoded message.

16. The non-transitory computer readable storage medium of claim 15, wherein the message comprises an authentication code and further comprising:
instructions for receiving a response from the sleeping device via a communications channel other than a channel used to transmit the encoded message;
instructions for determining whether the response comprises the authentication code; and
instructions for, when the response comprises the authentication code, proceeding to communicate further with the sleeping device.

17. The non-transitory computer readable storage medium of claim 15, wherein the message comprises an instruction for the sleeping device to perform once awakened.

18. The non-transitory computer readable storage medium of claim 15, wherein the instructions for encoding the message for transmission via flashing light signal comprise instructions for encoding the message entirely onto rising edges of the sequence of light flashes.

19. The non-transitory computer readable storage medium of claim 15, wherein the instructions for encoding the message for transmission via flashing light signal comprise instructions for encoding the message according to a modified Morse code scheme wherein each pair of:
one of the DOT and DASH symbols, and
one of the End of Part of Letter, End of Letter, and End of Word symbols are associated with a unique duration, whereby collision of durations between symbol pairs is avoided.

20. The non-transitory computer readable storage medium of claim 15, wherein the instructions for controlling the light source comprise instructions for setting the intensity operable to cause power to be applied to the sleeping device based on a measure of an ambient light level.

* * * * *